(12) United States Patent
Xia

(10) Patent No.: US 7,300,967 B2
(45) Date of Patent: *Nov. 27, 2007

(54) POLYESTER POLYMER AND COPOLYMER COMPOSITIONS CONTAINING METALLIC TITANIUM PARTICLES

(75) Inventor: Zhiyong Xia, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/988,226

(22) Filed: Nov. 12, 2004

(65) Prior Publication Data

US 2006/0106192 A1    May 18, 2006

(51) Int. Cl.
*C08K 3/68* (2006.01)
*C08K 3/00* (2006.01)

(52) U.S. Cl. .............. 524/439; 524/440; 523/200; 523/218; 528/272

(58) Field of Classification Search .......... 528/272, 528/298, 302, 308.6; 428/35.7; 524/439, 524/448; 523/200, 218

See application file for complete search history.

(56) References Cited

U.S. PATENT DOCUMENTS

| | | |
|---|---|---|
| 3,264,255 A | 8/1966 | Taylor |
| 3,420,913 A | 1/1969 | Railsback |
| 3,733,309 A | 5/1973 | Wyeth et al. |
| 4,087,482 A | 5/1978 | Shaffer |
| 4,097,445 A | 6/1978 | Martins et al. |
| 4,159,301 A | 6/1979 | Buser et al. |
| 4,185,043 A | 1/1980 | Shaffer |
| 4,228,549 A | 10/1980 | Rispoli |
| 4,230,595 A | 10/1980 | Yamaji et al. |
| 4,250,078 A | 2/1981 | McFarlane et al. |
| 4,343,922 A | 8/1982 | Shaffer |
| 4,408,004 A | 10/1983 | Pengilly |
| 4,420,581 A | 12/1983 | McFarlane et al. |
| 4,476,272 A | 10/1984 | Pengilly |
| 4,481,314 A | 11/1984 | Rule |

(Continued)

FOREIGN PATENT DOCUMENTS

EP    0 429 311 A2    5/1991

(Continued)

OTHER PUBLICATIONS

Weissmann, Mariana, et al.; "Theoretical study of carbon-coated iron nanowires"; Physical Review B 70, 201401-1 through 201401-4; 2004; The American Physical Society.

(Continued)

*Primary Examiner*—Duc Truong
(74) *Attorney, Agent, or Firm*—Bernard J. Graves, Jr.; Michael K. Carrier

(57) ABSTRACT

Polyester compositions are disclosed that include polyester polymers or copolymers having incorporated therein metallic titanium particles that improve the reheat properties of the compositions. Processes for making such compositions are also disclosed. The titanium particles may be incorporated in the polyester by melt compounding, or may be added at any stage of the polymerization, such as during the melt-phase of the polymerization. A range of particle sizes may be used, as well as a range of particle size distributions. The polyester compositions are suitable for use in packaging made from processes in which a reheat step is desirable.

20 Claims, 5 Drawing Sheets

U.S. PATENT DOCUMENTS

| | | | |
|---|---|---|---|
| 4,520,078 A | 5/1985 | Rabinowitz et al. | |
| 4,535,118 A | 8/1985 | Pengilly | |
| 4,604,303 A | 8/1986 | Takakura et al. | |
| 4,617,374 A | 10/1986 | Pruett et al. | |
| 4,702,963 A | 10/1987 | Phillips et al. | |
| 4,740,377 A | 4/1988 | Dawes et al. | |
| 5,220,140 A | 6/1993 | Ball et al. | |
| 5,300,746 A | 4/1994 | Walters et al. | |
| 5,310,977 A | 5/1994 | Stenkamp et al. | |
| 5,340,884 A | 8/1994 | Mills et al. | |
| 5,367,070 A | 11/1994 | Nath et al. | |
| 5,382,157 A | 1/1995 | Denis et al. | |
| 5,409,983 A | 4/1995 | Jones et al. | |
| 5,419,936 A | 5/1995 | Tindale | |
| 5,529,744 A | 6/1996 | Tindale | |
| 5,593,740 A | 1/1997 | Strumban et al. | |
| 5,656,221 A | 8/1997 | Schumann et al. | |
| 5,656,716 A | 8/1997 | Schmidt et al. | |
| 5,774,571 A | 6/1998 | Marshall | |
| 5,830,544 A | 11/1998 | Kerscher et al. | |
| 5,851,668 A | 12/1998 | Sandor et al. | |
| 5,906,882 A | 5/1999 | Valente et al. | |
| 5,925,710 A | 7/1999 | Wu et al. | |
| 5,940,022 A | 8/1999 | Takatsu | |
| 5,976,450 A | 11/1999 | Mreijen | |
| 5,998,004 A * | 12/1999 | Nishino et al. | 428/217 |
| 6,022,920 A | 2/2000 | Maxwell et al. | |
| 6,031,128 A | 2/2000 | Roh et al. | |
| 6,165,601 A | 12/2000 | Noda et al. | |
| 6,197,851 B1 | 3/2001 | Maxwell et al. | |
| 6,200,659 B1 | 3/2001 | Fujimori et al. | |
| 6,261,656 B1 | 7/2001 | Semersky | |
| 6,274,852 B1 | 8/2001 | Blok et al. | |
| 6,300,399 B1 | 10/2001 | Gallucci et al. | |
| 6,323,271 B1 | 11/2001 | Caldwell et al. | |
| 6,358,578 B1 | 3/2002 | Otto et al. | |
| 6,427,826 B1 | 8/2002 | Li et al. | |
| 6,428,882 B1 | 8/2002 | Peiffer et al. | |
| 6,465,098 B2 | 10/2002 | Mizuguchi et al. | |
| 6,472,471 B2 | 10/2002 | Cooke et al. | |
| 6,473,024 B2 | 10/2002 | Toyoda et al. | |
| 6,503,586 B1 | 1/2003 | Wu et al. | |
| 6,660,792 B2 | 12/2003 | Massey et al. | |
| 6,716,904 B2 | 4/2004 | Takahashi | |
| 6,773,800 B2 | 8/2004 | Hosoe et al. | |
| 6,777,048 B2 | 8/2004 | Quillen | |
| 6,780,916 B2 | 8/2004 | Tung et al. | |
| 6,797,401 B2 | 9/2004 | Herron | |
| 2002/0011694 A1 | 1/2002 | Nichols et al. | |
| 2002/0033560 A1 | 3/2002 | Nichols et al. | |
| 2003/0040564 A1 | 2/2003 | Tung et al. | |
| 2003/0108702 A1 | 6/2003 | Tung et al. | |
| 2004/0178386 A1 | 9/2004 | Tung et al. | |
| 2004/0180159 A1 | 9/2004 | Neal et al. | |
| 2004/0185198 A1 | 9/2004 | Sisson et al. | |

FOREIGN PATENT DOCUMENTS

| | | | |
|---|---|---|---|
| EP | 0581246 | | 2/1994 |
| EP | 0465040 B1 | | 1/1997 |
| EP | 0884365 A2 | | 12/1998 |
| EP | 0921144 A1 | | 6/1999 |
| EP | 1152035 A1 | | 11/2001 |
| EP | 1 535 944 A1 | | 6/2005 |
| FR | 2 675 654 | | 4/1991 |
| GB | 1 242 636 | * | 8/1971 |
| GB | 1 285 904 | | 8/1972 |
| JP | 52-039790 A | | 3/1977 |
| JP | 56159248 | | 12/1981 |
| JP | 59-015427 A | | 1/1984 |
| JP | 60-151826 | | 8/1985 |
| JP | 61-278558 | | 12/1986 |
| JP | 61-291650 | | 12/1986 |
| JP | 61278558 | * | 12/1986 |
| JP | 62-039208 | | 2/1987 |
| JP | 62-177035 | | 8/1987 |
| JP | 63-315604 | | 12/1988 |
| JP | 02194030 | | 7/1990 |
| JP | 22-14734 | | 8/1990 |
| JP | 06-184333 A | | 7/1994 |
| JP | 62-79599 | | 10/1994 |
| JP | 07058490 | | 3/1995 |
| JP | 07292087 | | 11/1995 |
| JP | 09-256220 A | | 9/1997 |
| JP | 1999 071106 A | | 3/1999 |
| JP | 11-181067 A | | 7/1999 |
| JP | 1999 236440 A | | 8/1999 |
| JP | 11-349868 | | 12/1999 |
| JP | 2000 302854 A | | 10/2000 |
| JP | 2001226474 | | 8/2001 |
| JP | 2001 262016 | | 9/2001 |
| JP | 2003306601 | | 10/2003 |
| WO | WO 96/03163 A1 | | 2/1996 |
| WO | WO 99/57173 A1 | | 11/1999 |
| WO | WO 01/21680 A1 | | 3/2001 |
| WO | WO 01/46306 A1 | | 6/2001 |
| WO | WO 01/47688 A2 | | 7/2001 |
| WO | WO 02/31840 A1 | | 4/2002 |
| WO | WO 03/010225 A1 | | 2/2003 |
| WO | WO 03/010226 A1 | | 2/2003 |
| WO | WO 2004/013015 A1 | | 2/2004 |
| WO | WO 2004/031258 | * | 4/2004 |
| WO | WO 2004/083294 A1 | | 9/2004 |
| WO | WO 2005/068531 A1 | | 7/2005 |
| WO | WO 2005/095516 A1 | | 10/2005 |

OTHER PUBLICATIONS

Zhang, Z. D. et al.; "Shell/core structure and magnetic properties of carbon-coated Fe-Co© nanocapsules"; Journal of Physics: Condensed Matter 13; 1921-1929; 2001; Institute of Physics Publishing Ltd.

Encyclopedia of Chemical Technology; 4$^{th}$ Edition; vol. 4; pp. 1015-1037; John Wiley and Sons, New York.

Pigment Handbook; 1973; pp. 323-349-; vol. 1; John Wiley and Sons; New York.

Billmeyer Jr., Fred W.; Principles of Color Technology; pp. 25-66; John Wiley and Sons; New York; 1981.

Pierson, H. O.; Handbook of Carbon, Graphite, Diamond and Fullerenes: Properties and Applications; pp. 122-140; Noyes Publications; 1993.

Toth, Louis E.; Transition Metal Carbides and Nitrides; p. 87; 1971; Academic Press; London.

Research Disclosure, 39771, May 1997, 343.

A. Boehm and A. Glaser, "The quaterrylimides-highly efficient NIR absorbers for plastics," ANTEC paper 2004, Chicago, IL, May 2004.

Wu, S. "A Generalized Criterion for Rubber Toughening: The Critical Matrix Ligament Thickness," Journal of Applied Polymer Science, vol. 35, 549-561, 1988, John Wiley & Sons, Inc.

Notification of Transmittal of the International Search Report and the Written Opinion of the International Searching Authority, or the Declaration date of mailing Feb. 1, 2006 for International Appl. No. PCT/US2005/030657.

Notification of Transmittal of the International Search Report and the Written Opinion of the International Searching Authority, or the Declaration date of mailing Feb. 16, 2006 for International Appl. No. PCT/US2005/030551.

Notification of Transmittal of the International Search Report and the Written Opinion of the International Searching Authority, or the Declaration date of mailing Mar. 14, 2006 for International Appl. No. PCT/US2005/042471.

Notification of Transmittal of the International Search Report and the Written Opinion of the International Searching Authority, or the Declaration date of mailing Feb. 28, 2006 for International Appl. No. PCT/US2005/038730.

Copending U.S. Appl. No. 11/372,819 filed Mar. 10, 2006.

Copending U.S. Appl. No. 11/054,194 filed Feb. 9, 2005.

Copending U.S. Appl. No. 11/229,238 filed Sep. 16, 2005.

Copending U.S. Appl. No. 11/495,431 filed Jul. 28, 2006.

Copending U.S. Appl. No. 11/524,056 filed Sep. 6, 2006.

Office Action dated Jun. 8, 2006, in copending U.S. Appl. No. 11/005,689.

Office Action dated Jul. 20, 2006, in copending U.S. Appl. No. 11/228,672.

Office Action dated Jan. 22, 2007, in copending U.S. Appl. No. 11/228,672.

Notification of Transmittal of the International Search Report and the Written Opinion of the International Searching Authority, or the Declaration date of mailing Feb. 15, 2007 for International Application No. PCT/US2005/030834.

Notification of Transmittal of the International Search Report and the Written Opinion of the International Searching Authority, or the Declaration date of mailing Oct. 27, 2005 for International Application No. PCT/US2005/038606.

Notification of Transmittal of the International Search Report and the Written Opinion of the International Searching Authority, or the Declaration date of mailing Jun. 26, 2006 for International Application No. PCT/US2006/009692.

Notification of Transmittal of the International Search Report and the Written Opinion of the International Searching Authority, or the Declaration date of mailing Feb. 2, 2006 for International Application No. PCT/US2006/003874.

Notification of Transmittal of the International Search Report and the Written Opinion of the International Searching Authority, or the Declaration date of mailing Feb. 13, 2007 for International Application No. PCT/US2006/034412.

* cited by examiner

POLYESTER POLYMER AND COPOLYMER COMPOSITIONS CONTAINING METALLIC TITANIUM PARTICLES

FIELD OF THE INVENTION

The invention relates to polyester compositions that are useful in packaging, such as in the manufacture of beverage containers by reheat blow molding, or other hot forming processes in which polyester is reheated. The compositions exhibit improved reheat, while maintaining acceptable visual appearance, such as clarity and color.

BACKGROUND OF THE INVENTION

Many plastic packages, such as those made from poly (ethylene terephthalate) (PET) and used in beverage containers, are formed by reheat blow-molding, or other operations that require heat softening of the polymer.

In reheat blow-molding, bottle preforms, which are test-tube shaped extrusion moldings, are heated above the glass transition temperature of the polymer, and then positioned in a bottle mold to receive pressurized air through their open end. This technology is well known in the art, as shown, for example in U.S. Pat. No. 3,733,309, incorporated herein by reference. In a typical blow-molding operation, radiation energy from quartz infrared heaters is generally used to reheat the preforms.

In the preparation of packaging containers using operations that require heat softening of the polymer, the reheat time, or the time required for the preform to reach the proper temperature for stretch blow molding (also called the heat-up time), affects both the productivity and the energy required. As processing equipment has improved, it has become possible to produce more units per unit time. Thus it is desirable to provide polyester compositions which provide improved reheat properties, by reheating faster (increased reheat rate), or with less reheat energy (increased reheat efficiency), or both, compared to conventional polyester compositions.

The aforementioned reheat properties vary with the absorption characteristics of the polymer itself. Heat lamps used for reheating polymer preforms are typically infrared heaters, such as quartz infrared lamps, having a broad light emission spectrum, with wavelengths ranging from about 500 nm to greater than 1,500 nm. However, polyesters, especially PET, absorb poorly in the region from 500 nm to 1,500 nm. Thus in order to maximize energy absorption from the lamps and increase the preform's reheat rate, materials that will increase infrared energy absorption are sometimes added to PET. Unfortunately, these materials tend to have a negative effect on the visual appearance of PET containers, for example increasing the haze level and/or causing the article to have a dark appearance. Further, since compounds with absorbance in the range of 400-700 nm appear colored to the human eye, materials that absorb in this wavelength range will impart color to the polymer.

A variety of black and gray body absorbing compounds have been used as reheat agents to improve the reheat characteristics of polyester preforms under reheat lamps. These reheat additives include carbon black, graphite, antimony metal, black iron oxide, red iron oxide, inert iron compounds, spinel pigments, and infrared absorbing dyes. The amount of absorbing compound that can be added to a polymer is limited by its impact on the visual properties of the polymer, such as brightness, which may be expressed as an L* value, and color, which is measured and expressed as an a* value and a b* value, as further described below.

To retain an acceptable level of brightness and color in the preform and resulting blown articles, the quantity of reheat additive may be decreased, which in turn decreases reheat rates. Thus, the type and amount of reheat additive added to a polyester resin is adjusted to strike the desired balance between increasing the reheat rate and retaining acceptable brightness and color levels.

There remains a need in the art for polyester compositions containing reheat additives that improve reheat without the problems associated with known reheat additives, such as unacceptable reductions in brightness, clarity, and color.

SUMMARY OF THE INVENTION

The invention relates to polyester compositions that comprise polyester polymers or copolymers, and especially thermoplastic polyester polymers or copolymers, having incorporated therein metallic titanium particles that improve the reheat properties of the compositions. The titanium particles may be incorporated in the polyester by melt compounding, or may be added at any stage of the polymerization, such as during the melt-phase of the polymerization. A range of particle sizes may be used, as well as a range of particle size distributions.

The polyester compositions according to the invention are suitable for use in packaging in which a reheat step is desirable or necessary, and are provided with metallic titanium particles to improve reheat efficiency. These compositions may be provided as a melt, in solid form, as preforms such as for blow molding, as sheets suitable for thermoforming, as concentrates, and as bottles, the compositions comprising a polyester polymer, with metallic titanium particles dispersed in the polyester. Suitable polyesters include polyalkylene terephthalates and polyalkylene naphthalates.

The invention relates also to processes for the manufacture of polyester compositions in which metallic titanium particles may be added to any stage of a polyester polymerization process, such as during the melt phase for the manufacture of polyester polymers. The metallic titanium particles may also be added to the polyester polymer which is in the form of solid-stated pellets, or to an injection molding machine for the manufacture of preforms from the polyester polymers.

DETAILED DESCRIPTION OF THE INVENTION

Figure 1:
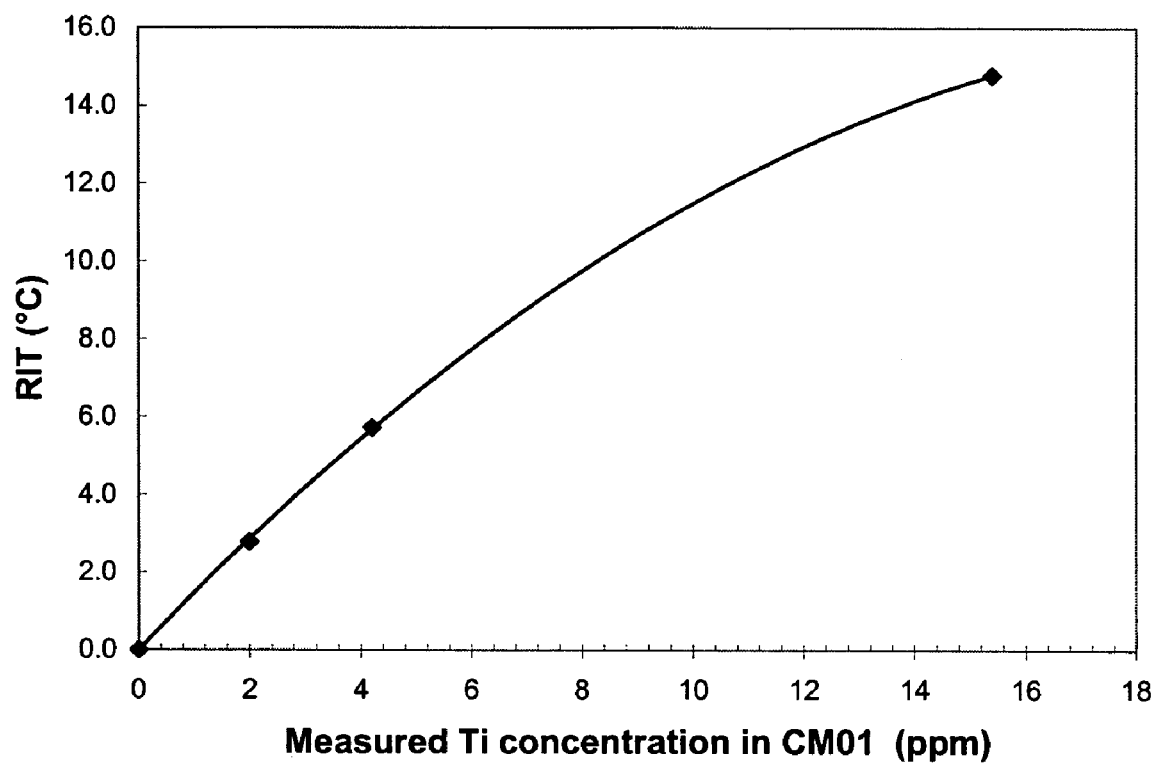
FIG. 1 depicts the correlation between titanium metal particle concentration and twenty-ounce bottle preform reheat improvement temperature (RIT).

The present invention may be understood more readily by reference to the following detailed description of the invention, including the appended figures, and to the examples provided. It is to be understood that this invention is not limited to the specific processes and conditions described, because specific processes and process conditions for processing plastic articles may vary. It is also to be understood that the terminology used is for the purpose of describing particular embodiments only and is not intended to be limiting.

As used in the specification and the claims, the singular forms "a," "an," and "the" include plural referents unless the context clearly dictates otherwise. For example, reference to processing a thermoplastic "preform," "container" or "bottle" is intended to include the processing of a plurality of thermoplastic preforms, articles, containers, or bottles.

By "comprising" or "containing" we mean that at least the named compound, element, particle, etc. must be present in the composition or article, but does not exclude the presence of other compounds, materials, particles, etc., even if the other such compounds, material, particles, etc. have the same function as what is named.

As used herein, a "$d_{50}$ particle size" is the median diameter, where 50% of the volume is composed of particles larger than the stated $d_{50}$ value, and 50% of the volume is composed of particles smaller than the stated $d_{50}$ value. As used herein, the median particle size is the same as the $d_{50}$ particle size.

According to the invention, metallic titanium particles are used to increase the reheat rate of the compositions in which the particles are distributed. The metallic titanium particles may comprise elemental titanium, or may comprise one or more titanium metal alloys, the amount and nature of the alloying material not being especially critical, so long as the alloying material does not substantially affect the ability of the resulting titanium alloy to increase the reheat rate of the polymer compositions. Titanium and titanium alloys suitable for use according to the invention include those further described below and in the "Titanium and Titanium Alloys" entry of Kirk-Othmer *Encyclopedia of Chemical Technology*, Vol. 24, 4th ed., (1997) pp. 186-224, incorporated herein by reference.

The metallic titanium particles useful according to the claimed invention may predominantly comprise, in terms of weight percent, elemental titanium metal, with typical impurities, in which the titanium metal may be predominantly elemental titanium, or a titanium metal alloy in which titanium may be alloyed with one or more other metals, semi-metals, and/or non-metals, so long as the alloys substantially retain the metallic properties of titanium, and including the use of alloy metals that result in alpha-alloy, beta-alloy, or alpha-beta alloy mixtures. Thus, alloys useful according to the invention may be in the form of a single-phase alloy or a multiple phase alloy. Important α-stabilizing alloying elements include, for example, aluminum, tin, and zirconium, and the interstitial alloying elements oxygen, nitrogen, and carbon. Important β-stabilizing alloying elements include vanadium, molybdenum, tantalum, and niobium (all β-isomorphous), and manganese, iron, chromium, cobalt, nickel, copper, and silicon (all β-eutectoid).

Further, the phase or phases present in the metallic titanium alloy particles according to the invention may be in the form of an amorphous phase, a solid solution phase, or an intermetallic compound phase solid solution, and may thus be distinguished from compositions comprised predominantly of titanium compounds such as those in which the titanium has a higher oxidation state, although the alloys may, of course, include compounds of titanium that result from the alloying process, again so long as the alloys substantially retain their metallic properties.

Alloys useful according to the invention thus include those in which titanium and one or more other metals or nonmetals are intimately mixed with titanium, such as when molten, so that they are fused together and dissolved with each other to form, at least in part, a solid solution. We do not mean, of course, to exclude titanium alloys that have measurable amounts of carbides, nitrides, or oxides present, up to about 50 wt. %, so long as such alloys retain substantial metallic properties, and in any event, the titanium present substantially retains its metallic properties, the presence of titanium compounds in the alloy notwithstanding.

Metals that may be alloyed with titanium in amounts up to 25 wt. %, or up to 50 wt. % or more thus include one or more of: aluminum, tin, zirconium, manganese, germanium, iron, chromium, tungsten, molybdenum, vanadium, niobium, tantalum, cobalt, nickel, palladium, ruthenium, or copper, and especially aluminum, tin, or zirconium. Aluminum, when present, may be in an amount up to about 7.5 wt. %, for example, or up to about 27 wt. %, or from about 0.5 wt. % to about 7.5 wt. %, or from about 0.5 wt. % to about 27 wt. %. Titanium alloys suitable for use according to the invention include those described in ASTM B265 "Titanium and Titanium Alloy Strip, Sheet, and Plate" incorporated herein by reference.

Metals and non-metals that can be present in minor amounts, for example up to about 10 wt. %, or more, include one or more of: gold, silver, copper, carbon, oxygen, nitrogen, or silicon. Alloys are thus suitable for use according to the invention so long as such alloys comprise at least 20 wt. % titanium metal, or at least 30 wt. % titanium, or at least 50 wt. % titanium, or at least 60 wt. % titanium, or at least 90 wt. % titanium, or at least 95 wt. % titanium, as determined, for example, by elemental analysis, especially when the titanium is the major alloying element. Not wishing to be bound by any theory, we believe that the effectiveness of titanium as a reheat additive may be a function of the absorptive properties of the titanium itself, such as the optical constants in the wavelength of interest, so that titanium alloys are also suitable for use according to the invention, so long as such alloys have a significant amount of titanium, such as the minimum amounts of titanium as already described.

The metallic titanium particles may thus be elemental titanium, or may be a titanium metal alloy in which titanium is alloyed with one or more other materials, such as other metals, so long as such other materials do not substantially affect the ability of the particles to increase the reheat properties of the polymer compositions.

The titanium metal particles of the invention can be and typically will be coated with a fine layer of titanium oxide coating, and are useful according to the invention so long as the oxide coating does not substantially affect the ability of the titanium particles to increase the reheat rate of the polymer compositions.

Metallic titanium particles useful according to the invention may be distinguished from non-metallic titanium compounds, such as those in which the titanium is present predominantly in a higher oxidation state, including titanium (II), titanium (III), and titanium (IV) compounds or complexes. Titanium compounds are further described in Kirk-Othmer *Encyclopedia of Chemical Technology*, Vol 24, 4th ed., (1997) pp. 225-349, incorporated herein by reference. Thus titanium compounds which may be used as condensation catalysts, for example titanium alkoxides or simple chelates, are distinguishable from metallic titanium particles. That is, if non-metallic titanium compounds are used as condensation catalysts to form the polymer in the compositions of the claimed invention, such polymers will additionally contain metallic titanium particles, as further described herein.

Metallic titanium particles useful according to the invention for the improvement of reheat and color in polyester compositions include those having a range of particle sizes and particle size distributions, although we have found certain particle sizes and relatively narrow particle size distributions to be especially suitable in certain applications. For example, in some embodiments, especially those in which the polyester comprises PET, metallic titanium particles having a median particle size of about 0.05 micrometers (µm), and a relatively narrow particle size distribution, are advantageous.

The particles useful according to the invention may likewise be titanium hollow spheres or titanium-coated spheres, in which the core is comprised of titanium, of mixtures of titanium with other materials, or of other materials in the substantial absence of titanium. Again, not being bound by any theory, we think it likely that the effectiveness of titanium as a reheat additive is a function of the absorptive properties of the titanium itself, so that titanium-coated particles are suitable for use according to the invention, so long as the coating thickness of titanium is sufficient to provide adequate reheat properties. Thus, in various embodiments, the thickness of the coating may be from about 0.005 µm to about 10 µm, or from 0.01 µm to 5 µm, or from 0.10 µm to 0.5 µm. Such titanium coatings may also comprise titanium alloys, as already described.

The amount of metallic titanium particles present in the polyester compositions according to the invention may vary within a wide range, for example from about 0.5 ppm to about 1000 ppm, or from 1 ppm to 500 ppm, or from 5 ppm to 100 ppm, or from 5 ppm to 50 ppm. Thermoplastic concentrates according to the invention may, of course, have amounts greater than these, as further described elsewhere herein.

We note that titanium metal particles can be produced by numerous techniques, as described in the Powder Metallurgy entry in Kirk-Othmer *Encyclopedia of Chemical Technology*, Vol 16, 4th ed., (1995) pp. 353-392, incorporated herein by reference. For example, the titanium metal particles according to the invention may be formed by atomization, reduction, decomposition, electrolytic deposition, precipitation, electrode spinning, high energy impaction, mechanical comminution, condensation, decomposition of metal hydrides, or rapid solidification technology.

In the atomization technique, a stream of molten metal is struck with water or air jet and the particles formed are collected, sieved, and annealed. In the reduction method, metal oxide is reduced in a solid or gaseous media. The decomposition method produces a fine powder of metal by the decomposition of liquid or gaseous carbonyls. Electrolytic decomposition from molten salts or solutions produces metal powder directly, or else produces an adherent mass that may be mechanically comminuted. In the precipitation process, titanium ammonium carbonate gives titanium powder when subjected to hydrogen in an autoclave. In the electrode spinning method, molten metal droplets are produced that are centrifuged in a closed chamber. In the high energy impact method, brittle coarse shapes are impinged against a tungsten carbide target at high velocities. Mechanical comminution techniques can produce relatively coarse particles by machining, or can produce fine particles by methods such as ball milling, impact milling, gyratory crushing, or eddy milling. Metal powders can be formed by condensation of metal vapors on cool surfaces. Metal hydrides can be decomposed by vacuum treatment to give powders of fine particle sizes. In rapid solidification technology, molten metal is quench cast as a continuous ribbon which is subsequently pulverized to an amorphous powder.

Shapes of metallic titanium powder which can be used in this invention include, but are not limited to, the following: acicular powder, angular powder, dendritic powder, equiaxed powder, flake powder, fragmented powder, granular powder, irregular powder, nodular powder, platelet powder, porous powder, rounded powder, and spherical powder. The particles may be of a filamentary structure, where the individual particles may be loose aggregates of smaller particles attached to form a bead or chain-like structure. The overall size of the particles may be variable, due to a variation in chain length and degree of branching.

The size of the metallic titanium particles may thus vary within a broad range depending on the method of production, and the numerical values for the particle sizes may vary according to the shape of the particles and the method of measurement. Particle sizes useful according to the invention may be from about 0.005 µm to about 100 µm, or from 0.01 µm to 10 µm, or from 0.01 µm to 5 µm. When the polyester composition comprises PET, we have found that particle sizes from 0.01 µm to 5 µm are especially suitable.

Metal particles, which have a mean particle size suitable for the invention, may have irregular shapes and form chain-like structures, although roughly spherical particles may be preferred. The particle size and particle size distribution may be measured by methods such as those described in the Size Measurement of Particles entry of Kirk-Othmer *Encyclopedia of Chemical Technology*, Vol. 22, 4th ed., (1997) pp. 256-278, incorporated herein by reference. For example, particle size and particle size distributions may be determined using a Fisher Subsieve Sizer or a Microtrac Particle-Size Analyzer manufactured by Leeds and Northrop Company, or by microscopic techniques, such as scanning electron microscopy or transmission electron microscopy.

A range of particle size distributions may be useful according to the invention. The particle size distribution, as used herein, may be expressed by "span (S)," where S is calculated by the following equation:

$$S = \frac{d_{90} - d_{10}}{d_{50}}$$

where $d_{90}$ represents a particle size in which 90% of the volume is composed of particles smaller than the stated $d_{90}$; and $d_{10}$ represents a particle size in which 10% of the volume is composed of particles smaller than the stated $d_{10}$; and $d_{50}$ represents a particle size in which 50% of the volume is composed of particles larger than the stated $d_{50}$ value, and 50% of the volume is composed of particles smaller than the stated $d_{50}$ value.

Thus, particle size distributions in which the span (S) is from 0 to 10, or from 0 to 5, or from 0.01 to 2, may be used according to the invention.

In order to obtain a good dispersion of metallic titanium particles in the polyester compositions, a concentrate, containing for example about 500 ppm to about 1,000 ppm metallic titanium particles, may be prepared using a polyester such as a commercial grade of PET. The concentrate may then be let down into a polyester at the desired concentration, ranging, for example, from 1 ppm to 500 ppm.

The amount of metallic titanium particles used in the polyester will depend upon the particular application, the desired reduction in reheat time, and the toleration level in the reduction of a* and b* away from zero along with the movement of L* brightness values away from 100. Thus, in various embodiments, the quantity of metallic titanium particles may be at least 0.5 ppm, or at least 1 ppm, or at least 5 ppm. In many applications, the quantity of metallic titanium particles may be at-least 50 ppm, in some cases at least 60 ppm, and even at least 70 ppm. The maximum amount of metallic titanium particles may be limited by one or more of the desired reheat rate, or maintenance in L*, a*, b* and other color properties, which may vary among applications or customer requirements. In some embodiments, the amount may not exceed 500 ppm, or may be at or below 300 ppm, or may not exceed 250 ppm. In those applications where color, haze, and brightness are not important features to the application, however, the amount of metallic titanium particles used may be up to 1,000 ppm, or up to 5,000 ppm, or even up to 10,000 ppm. The amount can even exceed 10,000 ppm when formulating a concentrate with metallic titanium particles as discussed elsewhere herein.

The method by which the metallic titanium particles are incorporated into the polyester composition is not limited. The metallic titanium particles can be added to the polymer reactant system, during or after polymerization, to the polymer melt, or to the molding powder or pellets or molten polyester in the injection-molding machine from which the bottle preforms are made. They may be added at locations including, but not limited to, proximate the inlet to the esterification reactor, proximate the outlet of the esterification reactor, at a point between the inlet and the outlet of the esterification reactor, anywhere along the recirculation loop, proximate the inlet to the prepolymer reactor, proximate the outlet to the prepolymer reactor, at a point between the inlet and the outlet of the prepolymer reactor, proximate the inlet to the polycondensation reactor, or at a point between the inlet and the outlet of the polycondensation reactor.

The metallic titanium particles may be added to a polyester polymer, such as PET, and fed to an injection molding machine by any method, including feeding the metallic titanium particles to the molten polymer in the injection molding machine, or by combining the metallic titanium particles with a feed of PET to the injection molding machine, either by melt blending or by dry blending pellets.

Alternatively, the metallic titanium particles may be added to an esterification reactor, such as with and through the ethylene glycol feed optionally combined with phosphoric acid, to a prepolymer reactor, to a polycondensation reactor, or to solid pellets in a reactor for solid stating, or at any point in-between any of these stages. In each of these cases, the metallic titanium particles may be combined with PET or its precursors neat, as a concentrate containing PET, or diluted with a carrier. The carrier may be reactive to PET or may be non-reactive. The metallic titanium particles, whether neat or in a concentrate or in a carrier, and the bulk polyester, may be dried prior to mixing together. These may be dried in an atmosphere of dried air or other inert gas, such as nitrogen, and if desired, under sub-atmospheric pressure.

The impact of a reheat additive on the color of the polymer can be judged using a tristimulus color scale, such as the CIE L*a*b* scale. The L* value ranges from 0 to 100 and measures dark to light. The a* value measures red to green with positive values being red and negative values green. The b* value measures yellow to blue with yellow having positive values and blue negative values.

Color measurement theory and practice are discussed in greater detail in *Principles of Color Technology*, pp.25-66 by Fred W. Billmeyer, Jr., John Wiley & Sons, New York (1981), incorporated herein by reference.

L* values for the polyester compositions as measured on twenty-ounce bottle preforms discussed herein should generally be greater than 60, more preferably at least 65, and more preferably yet at least 70. Specifying a particular L* brightness does not imply that a preform having a particular sidewall cross-sectional thickness is actually used, but only that in the event the L* is measured, the polyester composition actually used is, for purposes of testing and evaluating the L* of the composition, injection molded to make a preform having a sidewall cross-sectional thickness of 0.154 inches.

The color of a desirable polyester composition, as measured in twenty-ounce bottle preforms having a nominal sidewall cross-sectional thickness of 0.154 inches, is generally indicated by an a* coordinate value preferably ranging from about minus 1.9 to about plus 0.5 or from about minus 1.5 to about plus 0.2. With respect to a b* coordinate value, it is generally desired to make a bottle preform having a b* value coordinate ranging from minus 3.0, or from minus 0.1 to positive value of less than plus 5.0, or less than plus 4.0, or less than plus 3.8, or less than plus 2.6.

The measurements of L*, a* and b* color values are conducted according to the following method. The instrument used for measuring b* color should have the capabilities of a HunterLab UltraScan XE, model U3350, using the CIE Lab Scale (L*, a*, b*), D65 (ASTM) illuminant, 100 observer and an integrating sphere geometry. Clear plaques, films, preforms, bottles, and are tested in the transmission mode under ASTM D1746 "Standard Test Method for Transparency of Plastic Sheeting." The instrument for measuring color is set up under ASTM E1164 "Standard Practice for Obtaining Spectrophotometric Data for Object-Color Evaluation."

More particularly, the following test methods can be used, depending upon whether the sample is a preform, or a bottle. Color measurements should be performed using a Hunter-Lab UltraScan XE (Hunter Associates Laboratory, Inc., Reston Va.), which employs diffuse/8° (illumination/view angle) sphere optical geometry, or equivalent equipment with these same basic capabilities. The color scale employed is the CIE L*a*b* scale with D65 illuminant and 10° observer specified.

Preforms having a mean outer diameter of 0.846 inches and a wall thickness of 0.154 inches are measured in regular transmission mode using ASTM D1746, "Standard Test Method for Transparency of Plastic Sheeting". Preforms are held in place in the instrument using a preform holder, available from HunterLab, and triplicate measurements are averaged, whereby the sample is rotated 90° about its center axis between each measurement.

The intrinsic viscosity (It.V.) values described throughout this description are set forth in dL/g unit as calculated from the inherent viscosity (Ih.V.) measured at 25° C. in 60/40 wt/wt phenol/tetrachloroethane. The inherent viscosity is calculated from the measured solution viscosity. The following equations describe these solution viscosity measurements, and subsequent calculations to Ih.V. and from Ih.V. to It.V:

$$\eta_{inh} = [ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane ln=Natural logarithm $t_s$=Sample flow time through a capillary tube $t_o$=Solvent-blank flow time through a capillary tube C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0}(\eta_{sp}/C) = \lim_{C \to 0} \ln(\eta_r/C)$$

where $\eta_{int}$=Intrinsic viscosity $\eta_r$=Relative viscosity=ts/to $\eta_{sp}$=Specific viscosity=$\eta_r$−1

Instrument calibration involves replicate testing of a standard reference material and then applying appropriate mathematical equations to produce the "accepted" I.V. values.

Calibration Factor=Accepted IV of Reference Material/ Average of Replicate Determinations Corrected IhV=Calculated IhV×Calibration Factor The intrinsic viscosity (It.V. or $\eta_{int}$) may be estimated using the Billmeyer equation as follows:

$$\eta_{int}=0.5[e^{0.5 \times Corrected\ IhV}-1]+(0.75 \times Corrected\ IhV)$$

Thus, a beneficial feature provided by polyester compositions containing titanium nitride particles is that the compositions and preforms made from these compositions have an improved reheat rate, expressed as a twenty-ounce bottle preform Reheat Improvement Temperature (RIT), relative to a control sample with no reheat additive.

The following test for RIT is used herein, in order to determine the reheat rate, or RIT, of the compositions described and claimed. Twenty-ounces preforms (with an outer diameter of 0.846 inches and a sidewall cross-sectional thickness of 0.154 inches) are run through the oven bank of a Sidel SBO2/3 blow molding unit. The lamp settings for the Sidel blow molding unit are shown in Table 1. The preform heating time in the heaters is 38 seconds, and the power output to the quartz infrared heaters is set at 64%.

TABLE 1

Sidel SBO2/3 lamp settings.

| | | Lamps ON = 1 OFF = 0 | | |
|---|---|---|---|---|
| Heating zone | Lamp power setting (%) | Heater 1 | Heater 2 | Heater 3 |
| Zone 8 | | | | |
| zone 7 | | | | |
| Zone 6 | | | | |
| Zone 5 | 90 | 1 | 0 | 1 |
| Zone 4 | 90 | 1 | 0 | 1 |
| Zone 3 | 90 | 1 | 0 | 1 |
| Zone 2 | 90 | 1 | 0 | 1 |
| Zone 1 | 90 | 1 | 1 | 1 |

In the test, a series of five twenty-ounce bottle preforms is passed in front of the quartz infrared heaters and the preform surface temperature is measured. All preforms are tested in a consistent manner. The preform reheat improvement temperature (RIT) is then calculated by comparing the difference in preform surface temperature of the target samples containing a reheat additive with that of the same polymer having no reheat additive. The higher the RIT value, the higher the reheat rate of the composition.

Thus, in various embodiments, the twenty-ounce bottle preform reheat improvement temperature (RIT) of the polyester compositions according to the claimed invention containing titanium nitride particles, may be from about 0.1° C., to about 3° C., or from 1° C. to 14° C.

In some embodiments, the polyester compositions containing metallic titanium particles, and preforms made from these compositions, may have a b* color of less than 4, or less than 3, and in any case greater than minus 3, at loadings ranging from 2 ppm to 15 ppm. Similarly, preforms from the polyester compositions according to the invention may have an L* brightness of at least 60.

According to the invention, in various embodiments, there are thus provided concentrate compositions comprising metallic titanium particles in an amount of at least 0.05 wt. %, or at least 2 wt. %, and up to about 20 wt. %, or up to 35 wt. %, and a thermoplastic polymer normally solid at 25° C. and 1 atm such as a polyester, polyolefin, or polycarbonate in an amount of at least 65 wt. %, or at least 80 wt. %, or up to 99 wt. % or more, each based on the weight of the concentrate composition. The concentrate may be in liquid, molten state, or solid form. The converter of polymer to preforms has the flexibility of adding metallic titanium particles to bulk polyester at the injection molding stage continuously, or intermittently, in liquid molten form or as a solid blend, and further adjusting the amount of metallic titanium particles contained in the preform by metering the amount of concentrate to fit the end use application and customer requirements.

The concentrate may be made by mixing metallic titanium particles with a polymer such as a polycarbonate, a polyester, a polyolefin, or mixtures of these, in a single or twin-screw extruder, and optionally compounding with other reheat additives. A suitable polycarbonate is bisphenol A polycarbonate. Suitable polyolefins include, but not limited to, polyethylene and polypropylene, and copolymers thereof. Melt temperatures should be at least as high as the melting point of the polymer. For a polyester, such as PET, the melt temperatures are typically in the range of 250°-310° C. Preferably, the melt compounding temperature is maintained as low as possible. The extrudate may be withdrawn in any form, such as a strand form, and recovered according to the usual way such as cutting.

The concentrate may be prepared in a similar polyester as used in the final article. However, in some cases it may be advantageous to use another polymer in the concentrate, such as a polyolefin. In the case where a polyolefin/metallic titanium particles concentrate is blended with the polyester, the polyolefin can be incorporated as a nucleator additive for the bulk polyester.

The concentrate may be added to a bulk polyester or anywhere along the different stages for manufacturing PET, in a manner such that the concentrate is compatible with the bulk polyester or its precursors. For example, the point of addition or the It.V. of the concentrate may be chosen such that the It.V. of the polyethylene terephthalate and the It.V. of the concentrate are similar, e.g. ±0.2 It.V. measured at 25° C. in a 60/40 wt/wt phenol/tetrachloroethane solution. A concentrate can be made with an It.V. ranging from 0.3 dL/g to 1.1 dL/g to match the typical It.V. of a polyethylene terephthalate under manufacture in the polycondensation stage. Alternatively, a concentrate can be made with an It.V. similar to that of solid-stated pellets used at the injection molding stage (e.g. It.V. from 0.6 dL/g to 1.1 dL/g).

Other components can be added to the polymer compositions of the present invention to enhance the performance properties of the polyester composition. For example, crystallization aids, impact modifiers, surface lubricants, denesting agents, stabilizers, antioxidants, ultraviolet light absorbing agents, catalyst deactivators, colorants, nucleating agents, acetaldehyde reducing compounds, other reheat enhancing aids, fillers, anti-abrasion additives, and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art. Any of these compounds can be used in the present composition.

The polyester compositions of the present invention may be used to form preforms used for preparing packaging containers. The preform is typically heated above the glass transition temperature of the polymer composition by passing the preform through a bank of quartz infrared heating lamps, positioning the preform in a bottle mold, and then blowing pressurized air through the open end of the mold.

A variety of other articles can be made from the polyester compositions of the invention. Articles include sheet, film, bottles, trays, other packaging, rods, tubes, lids, and injection molded articles. Any type of bottle can be made from the polyester compositions of the invention. Thus, in one embodiment, there is provided a beverage bottle made from PET suitable for holding water. In another embodiment, there is provided a heat-set beverage bottle suitable for holding beverages which are hot-filled into the bottle. In yet another embodiment, the bottle is suitable for holding carbonated soft drinks.

The metallic titanium particle reheat additives used in the invention affect the reheat rate, brightness and color of preforms. Any one or more of these performance characteristics may be adjusted by varying the amount of reheat additive used, or by changing the particle size, or the particle size distribution.

The invention also provides processes for making polyester preforms that comprise feeding a liquid or solid bulk polyester and a liquid, molten or solid polyester concentrate composition to a machine for manufacturing the preform, the concentrate being as described elsewhere. According to the invention, not only may the concentrate be added at the stage for making preforms, but in other embodiments, there are provided processes for the manufacture of polyester compositions that comprise adding a concentrate polyester composition to a melt phase for the manufacture of virgin polyester polymers, the concentrate comprising metallic titanium particles and at least 65 wt. % of a polyester polymer. Alternatively, the titanium particles may be added to recycled PET.

The polyester compositions according to the invention have a good reheat rate with acceptable color properties.

In yet another embodiment of the invention, there is provided a polyester beverage bottle made from a preform, wherein the preform has a reheat improvement temperature (RIT) of 10° C. or more at a preform L* value of 70 or more.

In each of the described embodiments, there are also provided additional embodiments encompassing the processes for the manufacture of each, and the preforms and articles, and in particular bottles, blow-molded from the preforms, as well as their compositions containing metallic titanium particles.

The polyester compositions of this invention may be any thermoplastic polymers, optionally containing any number of ingredients in any amounts, provided that the polyester component of the polymer is present in an amount of at least 30 wt. %, or at least 50 wt. %, or at least 80 wt. %, or even 90 wt. % or more, based on the weight of the polymer, the backbone of the polymer typically including repeating terephthalate or naphthalate units.

Examples of suitable polyester polymers include one or more of: PET, polyethylene naphthalate (PEN), poly(1,4-cyclo-hexylenedimethylene) terephthalate (PCT), poly(ethylene-co-1,4-cyclohexanedimethylene terephthalate) (PETG), copoly(1,4-cyclohexylene dimethylene/ethylene terephthalate) (PCTG) and their blends or their copolymers. The form of the polyester composition is not limited, and includes a melt in the manufacturing process or in the molten state after polymerization, such as may be found in an injection molding machine, and in the form of a liquid, pellets, preforms, and/or bottles. Polyester pellets may be isolated as a solid at 25° C. and 1 atm in order for ease of transport and processing. The shape of the polyester pellet is not limited, and is typified by regular or irregular shaped discrete particles and may be distinguished from a sheet, film, or fiber.

It should also be understood that as used herein, the term polyester is intended to include polyester derivatives, including, but not limited to, polyether esters, polyester amides, and polyetherester amides. Therefore, for simplicity, throughout the specification and claims, the terms polyester, polyether ester, polyester amide, and polyetherester amide may be used interchangeably and are typically referred to as polyester, but it is understood that the particular polyester species is dependant on the starting materials, i.e., polyester precursor reactants and/or components.

The location of the metallic titanium particles within the polyester compositions is not limited. The metallic titanium particles may be disposed anywhere on or within the polyester polymer, pellet, preform, or bottle. Preferably, the polyester polymer in the form of a pellet forms a continuous phase. By being distributed "within" the continuous phase we mean that the metallic titanium particles are found at least within a portion of a cross-sectional cut of the pellet. The metallic titanium particles may be distributed within the polyester polymer randomly, distributed within discrete regions, or distributed only within a portion of the polymer. In a preferred embodiment, the metallic titanium particles are disposed randomly throughout the polyester polymer composition as by way of adding the metallic titanium particles to a melt, or by mixing the metallic titanium particles with a solid polyester composition followed by melting and mixing.

The metallic titanium particles may be added in an amount so as to achieve a twenty-ounce bottle preform reheat improvement temperature (RIT) of at least 3° C., or at least 5° C., or at least 10° C., while maintaining acceptable preform color properties.

Suitable amounts of metallic titanium particles in the polyester compositions (other than polyester concentrate compositions as discussed elsewhere), preforms, and containers, may thus range from about 0.5 ppm to about 500 ppm, based on the weight of the polymer in the polyester compositions, or as already described. The amount of the metallic titanium particles used may depend on the type and quality of the metallic titanium particles, the particle size, surface area, the morphology of the particle, and the level of reheat rate improvement desired.

The particle size may be measured with a laser diffraction type particle size distribution meter, or scanning or transmission electron microscopy methods. Alternatively, the particle size can be correlated by a percentage of particles screened through a mesh. Metallic titanium particles having a particle size distribution in which at least 80%, preferably at least 90%, more preferably at least 95% of the particles fall through an ASTM-E11 140 sieve are suitable for use as reheat agents. Metallic titanium particles having a particle size distribution in which at least 80%, preferably at least 90%, more preferably at least 95% of the particles fall through a ASTM-E11 325 sieve are also suitable for use as reheat agents.

The metallic titanium particles used in the invention not only enhance the reheat rate of a preform, but have only a minimal impact on the brightness of the preforms and bottles by not reducing the L* below acceptable levels. An acceptable L* value of preforms is deemed 60 or more when measured at a twenty-ounce bottle preform reheat improvement temperature (RIT) of 10° C.

In various other embodiments, there are provided polyester compositions, whether in the form of a melt, pellets, sheets, preforms, and/or bottles, comprising at least 0.5 ppm, or at least 50 ppm, or at least 100 ppm metallic titanium particles, having a $d_{50}$ particle size of less than 100 μm, or less than 50 μm, or less than 1 μm or less, wherein the polyester compositions have a preform L* value of 60 or more, or 68 or more, or even 70 or more, when measured at a RIT of 13° C., or 10° C., or 9° C.

According to various embodiments of the invention, metallic titanium particles may be added at any point during polymerization, which includes to the esterification zone, to the polycondensation zone comprised of the prepolymer zone and the finishing zone, to or prior to the pelletizing zone, and at any point between or among these zones. The metallic titanium particles may also be added to solid-stated pellets as they are exiting the solid-stating reactor. Furthermore, metallic titanium particles may be added to the PET pellets in combination with other feeds to the injection molding machine, or may be fed separately to the injection molding machine. For clarification, the metallic titanium particles may be added in the melt phase or to an injection molding machine without solidifying and isolating the polyester composition into pellets. Thus, the metallic titanium particles can also be added in a melt-to-mold process at any point in the process for making the preforms. In each instance at a point of addition, the metallic titanium particles can be added as a powder neat, or in a liquid, or a polymer concentrate, and can be added to virgin or recycled PET, or added as a polymer concentrate using virgin or recycled PET as the PET polymer carrier.

In other embodiments, the invention relates to processes for the manufacture of polyester compositions containing metallic titanium particles, such as polyalkylene terephthalate or naphthalate polymers made by transesterifying a dialkyl terephthalate or dialkyl naphthalate or by directly esterifying terephthalic acid or naphthalene dicarboxylic acid.

Thus, there are provided processes for making polyalkylene terephthalate or naphthalate polymer compositions by transesterifying a dialkyl terephthalate or naphthalate or directly esterifying a terephthalic acid or naphthalene dicarboxylic acid with a diol, adding metallic titanium particles to the melt phase for the production of a polyalkylene terephthalate or naphthalate after the prepolymer zone, or to polyalkylene terephthalate or naphthalate solids, or to an injection molding machine for the manufacture of bottle preforms.

Each of these process embodiments, along with a description of the polyester polymers, is now explained in further detail.

The polyester polymer may be PET, PEN, or copolymers or mixtures, thereof. A preferred polyester polymer is polyethylene terephthalate. As used herein, a polyalkylene terephthalate polymer or polyalkylene naphthalate polymer means a polymer having polyalkylene terephthalate units or polyalkylene naphthalate units in an amount of at least 60 mole % based on the total moles of units in the polymer, respectively. Thus, the polymer may contain ethylene terephthalate or naphthalate units in an amount of at least 85 mole %, or at least 90 mole %, or at least 92 mole %, or at least 96 mole %, as measured by the mole % of ingredients added to the reaction mixture. Thus, a polyethylene terephthalate polymer may comprise a copolyester of ethylene terephthalate units and other units derived from an alkylene glycol or aryl glycol with an aliphatic or aryl dicarboxylic acid.

While reference is made in certain instances to polyethylene terephthalate, it is to be understood that the polymer may also be a polyalkylene naphthalate polymer.

Polyethylene terephthalate can be manufactured by reacting a diacid or diester component comprising at least 60 mole % terephthalic acid or $C_1$-$C_4$ dialkylterephthalate, or at least 70 mole %, or at least 85 mole %, or at least 90 mole %, and for many applications at least 95 mole %, and a diol component comprising at least 60 mole % ethylene glycol, or at least 70 mole %, or at least 85 mole %, or at least 90 mole %, and for many applications, at least 95 mole %. It is preferable that the diacid component is terephthalic acid and the diol component is ethylene glycol. The mole percentage for all the diacid component(s) totals 100 mole %, and the mole percentage for all the diol component(s) totals 100 mole %.

The polyester pellet compositions may include admixtures of polyalkylene terephthalates, PEN, or mixtures thereof, along with other thermoplastic polymers, such as polycarbonates and polyamides. It is preferred in many instances that the polyester composition comprise a majority of a polyalkylene terephthalate polymers or PEN polymers, or in an amount of at least 80 wt. %, or at least 95 wt. %, based on the weight of polymers (excluding fillers, compounds, inorganic compounds or particles, fibers, impact modifiers, or other polymers which may form a discontinuous phase). In addition to units derived from terephthalic acid, the acid component of the present polyester may be modified with, or replaced by, units derived from one or more other dicarboxylic acids, such as aromatic dicarboxylic acids preferably having from 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acid units useful for the acid component are units from phthalic acid, isophthalic acid, naphthalene-2,6-dicarboxylic acid, cyclohexanedicarboxylic acid, cyclohexanediacetic acid, diphenyl-4, 4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being preferable.

It should be understood that use of the corresponding acid anhydrides, esters, and acid chlorides of these acids is included in the term "dicarboxylic acid".

In addition to units derived from ethylene glycol, the diol component of the present polyester may be modified with, or replaced by, units from additional diols including cycloaliphatic diols preferably having 6 to 20 carbon atoms and aliphatic diols preferably having 2 to 20 carbon atoms. Examples of such diols include diethylene glycol (DEG); triethylene glycol; 1,4-cyclohexanedimethanol; propane-1, 3-diol; butane-1,4-diol; pentane-1,5-diol; hexane-1,6-diol; 3-methylpentanediol-(2,4); 2-methylpentanediol-(1,4); 2,2, 4-trimethylpentane-diol-(1,3); 2,5-ethylhexanediol-(1,3);

2,2-diethyl propane-diol-(i, 3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

The polyester compositions of the invention may be prepared by conventional polymerization procedures well-known in the art sufficient to effect esterification and polycondensation. Polyester melt phase manufacturing processes include direct condensation of a dicarboxylic acid with a diol optionally in the presence of esterification catalysts in the esterification zone, followed by polycondensation in the prepolymer and finishing zones in the presence of a polycondensation catalyst; or else ester interchange usually in the presence of a transesterification catalyst in the esterification zone, followed by prepolymerization and finishing in the presence of a polycondensation catalyst, and each may optionally be subsequently solid-stated according to known methods. After melt phase and/or solid-state polycondensation the polyester polymer compositions typically have an intrinsic viscosity (It.V.) ranging from 0.55 dL/g to about 0.70 dL/g as precursor pellets, and an It.V. ranging from about 0.70 dL/g to about 1.1 dL/g for solid stated pellets.

To further illustrate, a mixture of one or more dicarboxylic acids, preferably aromatic dicarboxylic acids, or ester forming derivatives thereof, and one or more diols, are continuously fed to an esterification reactor operated at a temperature of between about 200° C. and 300° C., typically between 240° C. and 290° C., and at a pressure of about 1 psig up to about 70 psig. The residence time of the reactants typically ranges from between about one and five hours. Normally, the dicarboxylic acid is directly esterified with diol(s) at elevated pressure and at a temperature of about 240° C. to about 270° C. The esterification reaction is continued until a degree of esterification of at least 60% is achieved, but more typically until a degree of esterification of at least 85% is achieved to make the desired monomer. The esterification monomer reaction is typically uncatalyzed in the direct esterification process and catalyzed in transesterification processes. Polycondensation catalysts may optionally be added in the esterification zone along with esterification/transesterification catalysts.

Typical esterification/transesterification catalysts which may be used include titanium alkoxides, dibutyl tin dilaurate, used separately or in combination, optionally with zinc, manganese, or magnesium acetates or benzoates and/or other such catalyst materials as are well known to those skilled in the art. Phosphorus-containing compounds and cobalt compounds may also be present in the esterification zone. The resulting products formed in the esterification zone include bis(2-hydroxyethyl) terephthalate (BHET) monomer, low molecular weight oligomers, DEG, and water as the condensation by-product, along with other trace impurities formed by the reaction of the catalyst and other compounds such as colorants or the phosphorus-containing compounds. The relative amounts of BHET and oligomeric species will vary depending on whether the process is a direct esterification process, in which case the amount of oligomeric species are significant and even present as the major species, or a transesterification process, in which case the relative quantity of BHET predominates over the oligomeric species. The water is removed as the esterification reaction proceeds and excess ethylene glycol is removed to provide favorable equilibrium conditions. The esterification zone typically produces the monomer and oligomer mixture, if any, continuously in a series of one or more reactors. Alternatively, the monomer and oligomer mixture could be produced in one or more batch reactors.

It is understood, however, that in a process for making PEN, the reaction mixture will contain monomeric species such as bis(2-hydroxyethyl) naphthalate and its corresponding oligomers. Once the ester monomer is made to the desired degree of esterification, it is transported from the esterification reactors in the esterification zone to the polycondensation zone comprised of a prepolymer zone and a finishing zone.

Polycondensation reactions are initiated and continued in the melt phase in a prepolymerization zone and finished in the melt phase in a finishing zone, after which the melt may be solidified into precursor solids in the form of chips, pellets, or any other shape. For convenience, solids are referred to as pellets, but it is understood that a pellet can have any shape, structure, or consistency. If desired, the polycondensation reaction may be continued by solid-stating the precursor pellets in a solid-stating zone.

Although reference is made to a prepolymer zone and a finishing zone, it is to be understood that each zone may comprise a series of one or more distinct reaction vessels operating at different conditions, or the zones may be combined into one reaction vessel using one or more sub-stages operating at different conditions in a single reactor. That is, the prepolymer stage can involve the use of one or more reactors operated continuously, one or more batch reactors or even one or more reaction steps or sub-stages performed in a single reactor vessel. In some reactor designs, the prepolymerization zone represents the first half of polycondensation in terms of reaction time, while the finishing zone represents the second half of polycondensation. While other reactor designs may adjust the residence time between the prepolymerization zone to the finishing zone at about a 2:1 ratio, a common distinction in all designs between the prepolymerization zone and the finishing zone is that the latter zone operates at a higher temperature, lower pressure, and a higher surface renewal rate than the operating conditions in the prepolymerization zone. Generally, each of the prepolymerization and the finishing zones comprise one or a series of more than one reaction vessel, and the prepolymerization and finishing reactors are sequenced in a series as part of a continuous process for the manufacture of the polyester polymer.

In the prepolymerization zone, also known in the industry as the low polymerizer, the low molecular weight monomers and minor amounts of oligomers are polymerized via polycondensation to form polyethylene terephthalate polyester (or PEN polyester) in the presence of a catalyst. If the catalyst was not added in the monomer esterification stage, the catalyst is added at this stage to catalyze the reaction between the monomers and low molecular weight oligomers to form prepolymer and split off the diol as a by-product. If a polycondensation catalyst was added to the esterification zone, it is typically blended with the diol and fed into the esterification reactor as the diol feed. Other compounds such as phosphorus-containing compounds, cobalt compounds, and colorants can also be added in the prepolymerization zone. These compounds may, however, be added in the finishing zone instead of or in addition to the prepolymerization zone.

In a typical DMT-based process, those skilled in the art recognize that other catalyst material and points of adding the catalyst material and other ingredients vary from a typical direct esterification process.

Typical polycondensation catalysts include the compounds of antimony, titanium, germanium, zinc and tin in an amount ranging from 0.1 ppm to 1,000 ppm based on the weight of resulting polyester polymer. A common polymerization catalyst added to the prepolymerization zone is an antimony-based polymerization catalyst. Suitable antimony-based catalysts include antimony (III) and antimony (V) compounds recognized in the art, and in particular, diol-soluble antimony (III) and antimony (V) compounds with antimony (III) being most commonly used. Other suitable compounds include those antimony compounds that react with, but are not necessarily soluble in, the diols, with examples of such compounds including antimony (III) oxide. Specific examples of suitable antimony catalysts include antimony (III) oxide and antimony (III) acetate, antimony (III) glycolates, antimony (III) ethyleneglycoxide and mixtures thereof, with antimony (III) oxide being preferred. The preferred amount of antimony catalyst added is that effective to provide a level of between about 75 ppm and about 400 ppm of antimony by weight of the resulting polyester.

This prepolymer polycondensation stage generally employs a series of two or more vessels and is operated at a temperature of between about 250° C. and 305° C. for between about one and four hours. During this stage, the It.V. of the monomers and oligomers is typically increased up to about no more than 0.35 dL/g. The diol byproduct is removed from the prepolymer melt using an applied vacuum ranging from 15 torr to 70 torr to drive the reaction to completion. In this regard, the polymer melt is typically agitated to promote the escape of the diol from the polymer melt and to assist the highly viscous polymer melt in moving through the polymerization vessels. As the polymer melt is fed into successive vessels, the molecular weight and thus the intrinsic viscosity of the polymer melt increases. The temperature of each vessel is generally increased and the pressure decreased to allow for a greater degree of polymerization in each successive vessel. However, to facilitate removal of glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to, carbon dioxide, argon, helium, and nitrogen.

Once an It.V. of typically no greater than 0.35 dL/g is obtained, the prepolymer is fed from the prepolymer zone to a finishing zone where the second half of polycondensation is continued in one or more finishing vessels ramped up to higher temperatures than present in the prepolymerization zone, to a value within a range of from 280° C. to 305° C. until the It.V. of the melt is increased from the It.V of the melt in the prepolymerization zone (typically 0.30 dL/g but usually not more than 0.35 dL/g) to an It.V in the range of from about 0.50 dL/g to about 0.70 dL/g. The final vessel, generally known in the industry as the "high polymerizer," "finisher," or "polycondenser," is operated at a pressure lower than used in the prepolymerization zone, typically within a range of between about 0.8 torr and 4.0 torr. Although the finishing zone typically involves the same basic chemistry as the prepolymer zone, the fact that the size of the molecules, and thus the viscosity, differs, means that the reaction conditions also differ. However, like the prepolymer reactor, each of the finishing vessel(s) is connected to a flash vessel and each is typically agitated to facilitate the removal of ethylene glycol.

The residence time in the polycondensation vessels and the feed rate of the ethylene glycol and terephthalic acid into the esterification zone in a continuous process is determined in part based on the target molecular weight of the polyethylene terephthalate polyester. Because the molecular weight can be readily determined based on the intrinsic viscosity of the polymer melt, the intrinsic viscosity of the polymer melt is generally used to determine polymerization conditions, such as temperature, pressure, the feed rate of the reactants, and the residence time within the polycondensation vessels.

Once the desired It.V. is obtained in the finisher, the melt is fed to a pelletization zone where it is filtered and extruded into the desired form. The polyester polymers of the present invention are filtered to remove particulates over a designated size, followed by extrusion in the melt phase to form polymer sheets, filaments, or pellets. Although this zone is termed a "pelletization zone," it is understood that this zone is not limited to solidifying the melt into the shape of pellets, but includes solidification into any desired shape. Preferably, the polymer melt is extruded immediately after polycondensation. After extrusion, the polymers are quenched, preferably by spraying with water or immersing in a water trough, to promote solidification. The solidified condensation polymers are cut into any desired shape, including pellets.

As known to those of ordinary skill in the art, the pellets formed from the condensation polymers, in some circumstances, may be subjected to a solid-stating zone wherein the solids are first crystallized followed by solid-state polymerization (SSP) to further increase the It.V. of the polyester composition solids from the It.V exiting the melt phase to the desired It.V. useful for the intended end use. Typically, the It.V. of solid stated polyester solids ranges from 0.70 dL/g to 1.15 dL/g. In a typical SSP process, the crystallized pellets are subjected to a countercurrent flow of nitrogen gas heated to 180° C. to 220° C., over a period of time as needed to increase the It.V. to the desired target.

Thereafter, polyester polymer solids, whether solid stated or not, are re-melted and re-extruded to form items such as containers (e.g., beverage bottles), filaments, films, or other applications. At this stage, the pellets are typically fed into an injection molding machine suitable for making preforms which are stretch blow molded into bottles.

As noted, metallic titanium particles may be added at any point in the melt phase or thereafter, such as to the esterification zone, to the prepolymerization zone, to the finishing zone, or to the pelletizing zone, or at any point between each of these zones, such as to metering devices, pipes, and mixers. The metallic titanium particles can also be added to the pellets in a solid stating zone within the solid stating zone or as the pellets exit the solid-stating reactor. Furthermore, the metallic titanium particles may be added to the pellets in combination with other feeds to the injection molding machine or fed separately to the injection molding machine.

If the metallic titanium particles are added to the melt phase, it is desirable to use particles having a small enough $d_{50}$ particle size to pass through the filters in the melt phase, and in particular the pelletization zone. In this way, the particles will not clog up the filters as seen by an increase in gear pump pressure needed to drive the melt through the filters. However, if desired, the metallic titanium particles can be added after the pelletization zone filter and before or to the extruder.

Thus, according to the invention, metallic titanium particles of a wide range of $d_{50}$ particle sizes can be added either together with a phosphorus-containing compound to the esterification zone, the prepolymer zone, or at any point in between, or after the addition of a phosphorus compound to the esterification zone prior to completing the esterification reaction to the desired degree, or after the addition of the phosphorus compound to any zone and to a reaction mixture containing an active phosphorus compound. The point at which the metallic titanium particles are added, or the presence or absence of such other active compounds in the melt, is not limited since the metallic titanium particles function to enhance the rate of reheat. The function of the metallic titanium particles as a reheat enhancing additive allows a wide operating window and flexibility to add the metallic titanium particles at any convenient point, even in the presence of active phosphorus-containing compounds in the melt phase.

Thus, the metallic titanium particles may be added together with phosphorus compounds either as a mixture in a feedstock stream to the esterification or prepolymer zone, or as separate feeds but added to the reaction mixture within the zone simultaneously. Alternatively, the metallic titanium particles may be added to a reaction mixture within the esterification zone after a phosphorus compound has been added to the same zone and before completion of the esterification reaction.

Typical phosphorus-containing compounds added in the melt phase include acidic phosphorus-containing compounds recognized in the art. Suitable examples of such additives include phosphoric acid, phosphorous acid, polyphosphoric acid, carboxyphosphonic acids, and each of their derivatives including acidic phosphate esters such as phosphate mono- and di-esters and non-acidic phosphate esters such as trimethyl phosphate, triethyl phosphate, tributyl phosphate, tributoxyethyl phosphate, tris(2-ethylhexyl) phosphate, trioctyl phosphate, triphenyl phosphate, tritolyl phosphate, ethylene glycol phosphate, triethyl phosphonoacetate, dimethyl methyl phosphonate, tetraisopropyl methylenediphosphonate, mixtures of mono-, di-, and tri-esters of phosphoric acid with ethylene glycol, diethylene glycol, and 2-ethylhexanol, or mixtures of each, among others.

In addition to adding metallic titanium particles to virgin polymer, whether to make a concentrate or added neat to the melt phase after the prepolymerization reactors or to an injection molding zone, metallic titanium particles may also be added to post-consumer recycle (PCR) polymer. PCR containing metallic titanium particles is added to virgin bulk polymers by solid/solid blending or by feeding both solids to an extruder. Alternatively, PCR polymers containing metallic titanium particles are advantageously added to the melt phase for making virgin polymer between the prepolymerization zone and the finishing zone. The It.V. of the virgin melt phase after the prepolymerization zone is sufficiently high at that point to enable the PCR to be melt blended with the virgin melt. Alternatively, PCR may be added to the finisher. In either case, the PCR added to the virgin melt phase may contain the metallic titanium particles. The metallic titanium particles may be combined with PCR by any of the methods noted above, or separately fed to and melt blended in a heated vessel, followed by addition of the PCR melt containing the metallic titanium particles to the virgin melt phase at these addition points.

Other components can be added to the compositions of the present invention to enhance the performance properties of the polyester polymers. For example, crystallization aids, impact modifiers, surface lubricants, denesting agents, compounds, antioxidants, ultraviolet light absorbing agents, catalyst deactivators, colorants, nucleating agents, acetaldehyde reducing compounds, other reheat rate enhancing aids, sticky bottle additives such as talc, and fillers and the like can be included. The polymer may also contain small amounts of branching agents such as trifunctional or tetrafunctional comonomers such as trimellitic anhydride, trimethylol propane, pyromellitic dianhydride, pentaerythritol, and other polyester forming polyacids or diols generally known in the art. All of these additives and many others and their use are well known in the art and do not require extensive discussion. Any of these compounds can be used in the present composition. It is preferable that the present composition be essentially comprised of a blend of thermoplastic polymer and metallic titanium particles, with only a modifying amount of other ingredients being present.

Examples of other reheat rate enhancing additives that may be used in combination with metallic titanium particles include carbon black, antimony metal, tin, copper, silver, gold, palladium, platinum, black iron oxide, and the like, as well as near infrared absorbing dyes, including, but not limited to, those disclosed in U.S. Pat. No. 6,197,851, incorporated herein by reference.

The compositions of the present invention optionally may additionally contain one or more UV absorbing compounds. One example includes UV-absorbing compounds which are covalently bound to the polyester molecule as either a comonomer, a side group, or an end group. Suitable UV-absorbing compounds are thermally stable at polyester processing temperatures, absorb in the range of from about 320 nm to about 380 nm, and are nonextractable from the polymer. The UV-absorbing compounds preferably provide less than about 20%, more preferably less than about 10%, transmittance of UV light having a wavelength of 370 nm through a bottle wall 305 µm thick. Suitable chemically reactive UV absorbing compounds may include, for example, substituted methine compounds.

Suitable compounds, their methods of manufacture and incorporation into polyesters are further disclosed in U.S. Pat. No. 4,617,374, the disclosure of which is incorporated herein by reference. The UV-absorbing compound(s) may be present in amounts between about 1 ppm to about 5,000 ppm by weight, preferably from about 2 ppm to about 1,500 ppm, and more preferably between about 10 ppm and about 500 ppm by weight. Dimers of the UV absorbing compounds may also be used. Mixtures of two or more UV absorbing compounds may be used. Moreover, because the UV absorbing compounds are reacted with or copolymerized into the backbone of the polymer, the resulting polymers display improved processability including reduced loss of the UV absorbing compound due to plateout and/or volatilization and the like.

The polyester compositions of the present invention are suitable for forming a variety of shaped articles, including films, sheets, tubes, preforms, molded articles, containers and the like. Suitable processes for forming the articles are known and include extrusion, extrusion blow molding, melt casting, injection molding, stretch blow molding, thermoforming, and the like.

The polyesters of this invention may also, optionally, contain color stabilizers, such as certain cobalt compounds. These cobalt compounds can be added as cobalt acetates or cobalt alcoholates (cobalt salts or higher alcohols). They can be added as solutions in ethylene glycol. Polyester resins containing high amounts of the cobalt additives can be prepared as a masterbatch for extruder addition. The addition of the cobalt additives as color toners is a process used to minimize or eliminate the yellow color, b*, of the resin. Other cobalt compounds such as cobalt aluminate, cobalt benzoate, cobalt chloride and the like may also be used as color stabilizers. It is also possible to add certain diethylene glycol (DEG) inhibitors to reduce or prevent the formation of DEG in the final resin product. Preferably, a specific type of DEG inhibitor would comprise a sodium acetate-containing composition to reduce formation of DEG during the esterification and polycondensation of the applicable diol with the dicarboxylic acid or hydroxyalkyl, or hydroxyalkoxy substituted carboxylic acid. It is also possible to add stress crack inhibitors to improve stress crack resistance of bottles, or sheeting, produced from this resin.

With regard to the type of polyester which can be utilized, any high clarity, neutral hue polyester, copolyester, etc., in the form of a resin, powder, sheet, etc., can be utilized to which it is desired to improve the reheat time or the heat-up time of the resin. Thus, polyesters made from either the dimethyl terephthalate or the terephthalic acid route or various homologues thereof as well known to those skilled in the art along with conventional catalysts in conventional amounts and utilizing conventional processes can be utilized according to the present invention. Moreover, the type of polyester can be made according to melt polymerization, solid state polymerization, and the like. Moreover, the present invention can be utilized for making high clarity, low haze powdered coatings. An example of a preferred type of high clarity polyester resin is set forth herein below wherein the polyester resin is produced utilizing specific amounts of antimony catalysts, low amounts of phosphorus and a bluing agent which can be a cobalt compound.

As noted above, the polyester is produced in a conventional manner as from the reaction of a dicarboxylic acid having from 2 to 40 carbon atoms with polyhydric alcohols such as glycols or diols containing from 2 to about 20 carbon atoms. The dicarboxylic acids can be an alkyl having from 2 to 20 carbon atoms, or an aryl, or alkyl substituted aryl containing from 8 to 16 carbon atoms. An alkyl diester having from 4 to 20 carbon atoms or an alkyl substituted aryl diester having from 10 to 20 carbon atoms can also be utilized. Desirably, the diols can contain from 2 to 8 carbon atoms and preferably is ethylene glycol. Moreover, glycol ethers having from 4 to 12 carbon atoms may also be used. Generally, most of the commonly produced polyesters are made from either dimethyl terephthalate or terephthalic acid with ethylene glycol. When powdered resin coatings are made, neopentyl glycol is often used in substantial amounts.

Specific areas of use of the polyester include situations wherein preforms exist which then are heated to form a final product, for example, as in the use of preforms which are blow-molded to form a bottle, for example, a beverage bottle, and the like. Another use is in preformed trays, preformed cups, and the like, which are heated and drawn to form the final product. Yet another use relates to polyester yarn which is forced through a plurality of spinnerets having an infrared quench collar thereabout. Additionally, the present invention is applicable to highly transparent, clear and yet low haze powdered coatings wherein a desired transparent film or the like is desired.

This invention can be further illustrated by the following examples of preferred embodiments, although it will be understood that these examples are included merely for purposes of illustration and are not intended to limit the scope of the invention unless otherwise specifically indicated.

EXAMPLES

The titanium (Ti) metal particles used in the examples were obtained from Argonide Nano-materials Technologies. The particles had a $d_{50}$ particle size of about 50 nm with a relatively narrow particle size distribution.

The polymer used in the examples was commercial grade PET Voridianz CM01 Polymer, which is a PET copolymer containing no reheat additive. The titanium metal particles were added into virgin CM01 during melt compounding. First, a concentrate containing 416 ppm titanium metal particles was made using a one-inch single screw extruder with saxton and pineapple mixing head. The extruder was also equipped with pelletization capability. The concentrate was then crystallized using a tumbling crystallizer at 170° C. for 1 hour. The crystallized concentrate was then let down into CM01 virgin polymer with the final concentration of titanium metal in CM01 ranging from 2 ppm to 15.4 ppm. During the compounding process, CM01 virgin polymer was used to purge the extruder barrel several times to ensure no cross contamination occurred between different batches. Finally, the CM01 polymers with different levels of titanium metal particles was injection molded into twenty-ounce bottle preforms using a BOY (22D) injection molding machine operated under standard molding conditions.

In the examples, the reheat of a given polyester composition was measured by twenty-ounce bottle preform Reheat Improvement Temperature (RIT). In order to determine the RIT of each composition, all preforms were run through the oven bank of a Sidel SBO2/3 blow molding unit in a consistent manner. The lamp settings for the Sidel blow molding machine are shown in Table 1. The reheat time was 38 seconds, and the power output to the quartz infrared heaters was set at 64%. A series of five preforms was passed in front of the quartz infrared heaters and the preform surface temperature was measured. As mentioned earlier, in the examples, the reheat rate of a given composition was measured by preform reheat improvement temperature (RIT). The preform reheat improvement temperature was calculated by comparing the difference in preform surface temperature of the target samples with that of the virgin CM01. The higher the RIT value, the higher the reheat rate of the composition.

The concentration of titanium metal particles in CM01 was determined by Inductively Coupled Plasma-Optical Emission Spectroscopy (ICP-OES) using a Perkin-Elmer Optima 2000 instrument. Differential Scanning Calorimetry (DSC) was used for crystallization half time ($t_{1/2}$) measurements. An isothermal crystallization kinetics experiment is performed using a Perkin-Elmer Pyris 1 using helium as a purge gas. The calorimeter is calibrated using indium and tin standards. A 10 mg sample is heated at 500° C./min from room temperature to 290° C. and held at temperature for 2 minutes. The sample is then control cooled at 500° C./min to the test temperature. The exothermic crystallization event is followed as a function of time and the time of peak exothermic activity is identified as the half-time of crystallization ($t_{1/2}$). The same sample is used to generate half-times for all temperatures desired, in decreasing order in 10° C. increments between 200° C. and 140° C.

Color measurements were performed using a HunterLab UltraScan XE (Hunter Associates Laboratory, Inc., Reston Va.), which employs diffuse/8° (illumination/view angle) sphere optical geometry. The color scale employed was the CIE LAB scale with D65 illuminant and 10° observer specified. Preforms with a mean outer diameter of 0.846 inches and a wall thickness of 0.154 inches were measured in regular transmission mode using ASTM D1746, "Standard Test Method for Transparency of Plastic Sheeting." Preforms were held in place in the instrument using a preform holder, available from HunterLab, and triplicate measurements were averaged, whereby the sample was rotated 90° about its center axis between each measurement.

Color in transmission at any thickness can be recalculated according to the following:

$$T_h = T_o 10^{-\beta h}$$

$$\beta = \frac{\log_{10}\left(\frac{T_o}{T_d}\right)}{d}$$

where
$T_h$=transmittance at target thickness
$T_o$=transmittance without absorption
$\beta$=Absorption coefficient
$T_d$=transmittance measured for sample
h=target thickness
d=thickness of sample Table 2 and FIG. 1 show the correlation between the concentration of metallic titanium particles and the reheat improvement temperature (RIT), from which one can see that 15.4 ppm titanium is needed to achieve a RIT of 14.8° C.

TABLE 2

Impact of titanium metal particles on twenty-ounce bottle preform reheat improvement temperature (RIT) and color.

| Sample No. | System | Ti $d_{50}$ (um) | Measured Ti concentration (ppm) | Preform RIT (° C.) | L* | a* | b* |
|---|---|---|---|---|---|---|---|
| 1 | CM01 | NA | 0 | 0.0 | 83.3 | −0.5 | 2.5 |
| 2 | Ti + CM01 | 0.05 | 2 | 2.8 | 79.7 | −0.4 | 2.3 |
| 3 | Ti + CM01 | 0.05 | 4.2 | 5.7 | 77.6 | −0.3 | 2.4 |
| 4 | Ti + CM01 | 0.05 | 15.4 | 14.8 | 62.5 | 0.1 | 2.6 |

Figure 4:
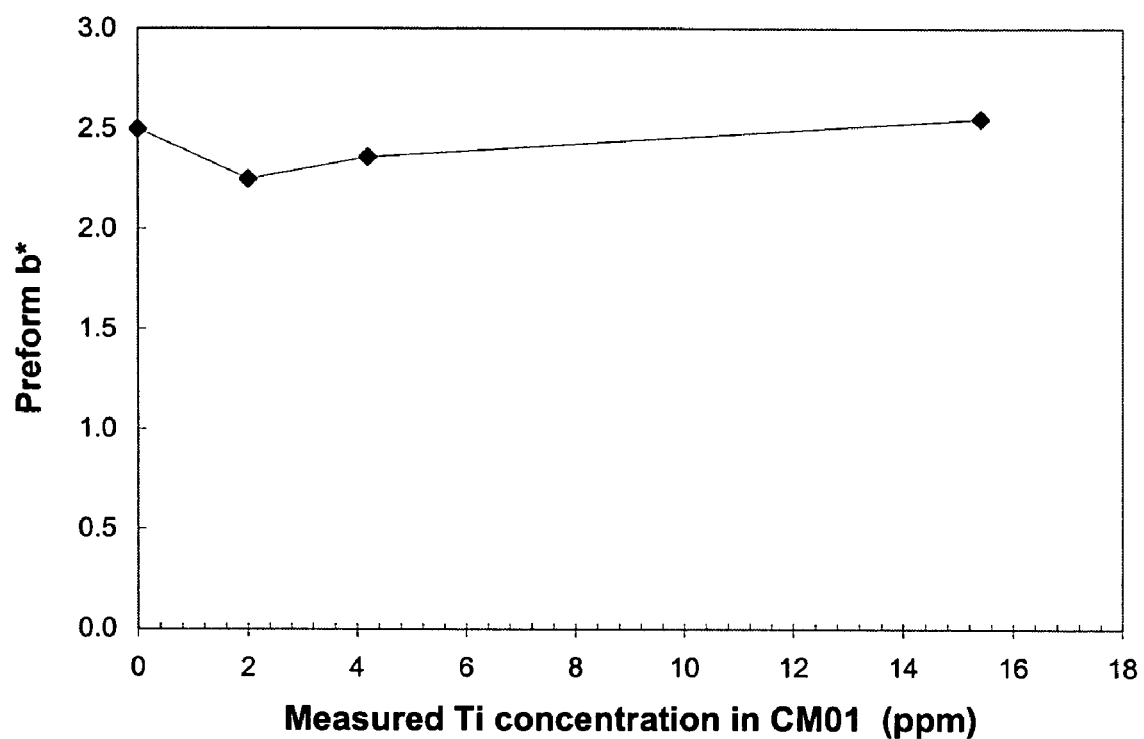
FIG. 4 depicts the correlation between titanium metal particle concentration and twenty-ounce bottle preform b* value.

FIG. 4 depicts the correlation between titanium metal particle concentration and twenty-ounce bottle preform b* value.

The impact of titanium metal particles on preform ItV is also shown in Table 3, from which one can see no significant preform ItV change resulted due to the addition of titanium metal particles.

TABLE 3

Impact of titanium metal particles on twenty-ounce bottle preform ItV.

| Sample No. | System | Measured Ti concentration (ppm) | Preform ItV |
|---|---|---|---|
| 5 | CM01 | 0 | 0.767 |
| 6 | Ti + CM01 | 2 | 0.764 |
| 7 | Ti + CM01 | 4.2 | 0.756 |
| 8 | Ti + CM01 | 15.4 | 0.729 |

Figure 5:
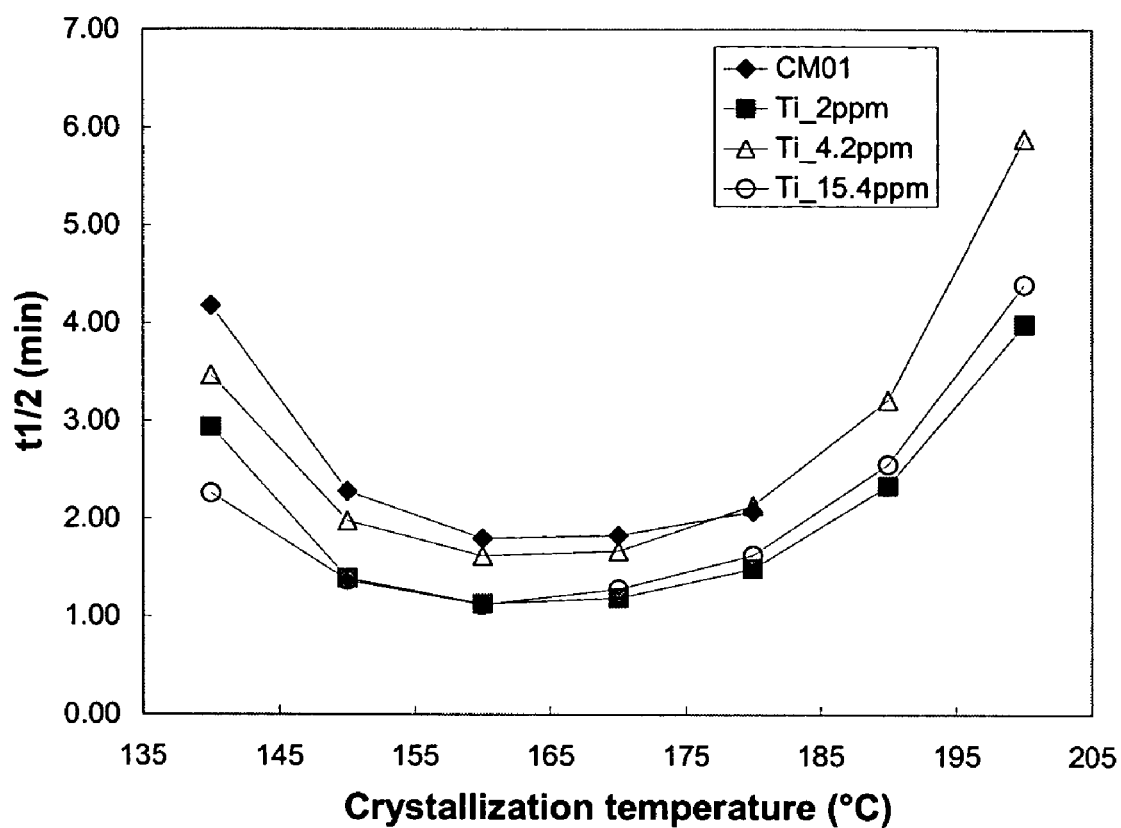
FIG. 5 depicts the crystallization half time ($t_{1/2}$) results for systems with different levels of titanium metal particles.

The impact of the metallic titanium particles on the crystallization kinetics is shown in Table 4 and FIG. 5. Based on these analyses, it is clear that the addition of these particles has only slightly changed the crystallization kinetics of virgin PET. This result indicates that the addition of titanium metal particles will not significantly increase the crystallization kinetics of the preform during the reheating process, which will enable a bottle with low level of crystalline haze to be blown.

TABLE 4

Correlation between titanium metal particle concentration and crystallization half time ($t_{1/2}$).

| Sample No. | System | Measured Ti concentration (ppm) | DSC t½ (minute) | | | | | | |
|---|---|---|---|---|---|---|---|---|---|
| | | | 200° C. | 190° C. | 180° C. | 170° C. | 160° C. | 150° C. | 140° C. |
| 9 | CM01 | 0 | — | — | 2.08 | 1.83 | 1.80 | 2.28 | 4.18 |
| 10 | Ti + CM01 | 2 | 3.99 | 2.34 | 1.49 | 1.19 | 1.13 | 1.39 | 2.94 |
| 11 | Ti + CM01 | 4.2 | 5.89 | 3.22 | 2.14 | 1.67 | 1.62 | 1.98 | 3.47 |
| 12 | Ti + CM01 | 15.4 | 4.4 | 2.56 | 1.63 | 1.28 | 1.12 | 1.37 | 2.26 |

FIG. 1 depicts the correlation between titanium metal particle concentration and twenty-ounce bottle preform reheat improvement temperature (RIT).

Figure 2:
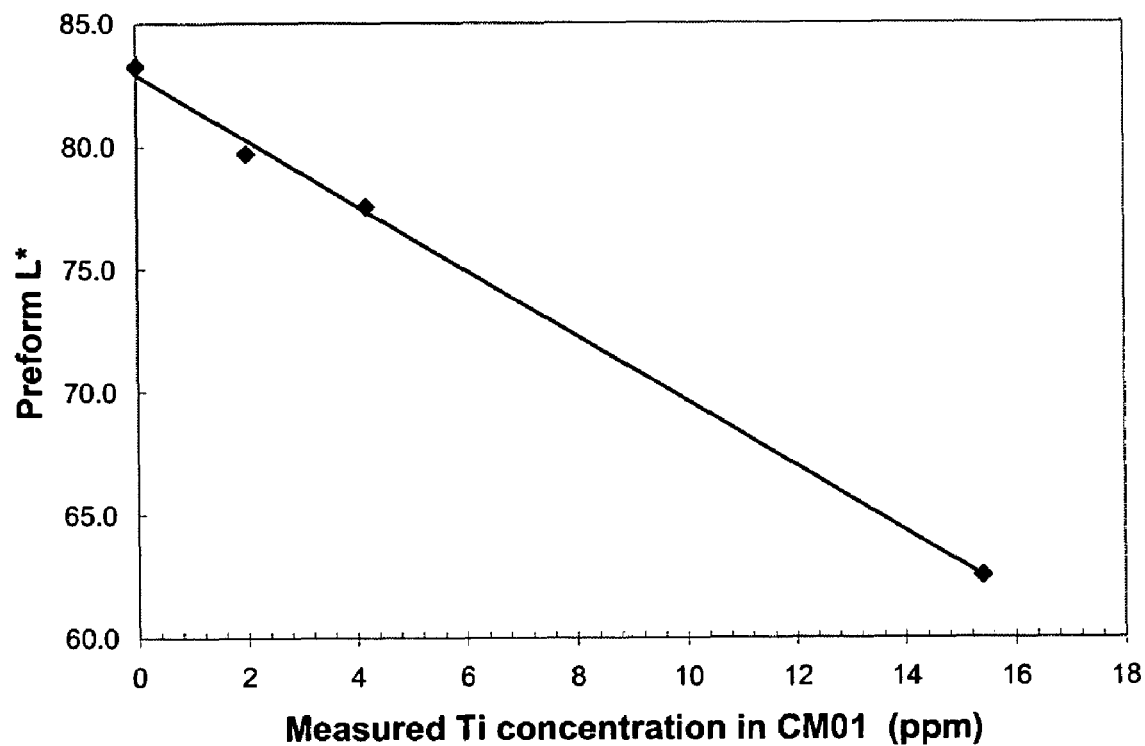
FIG. 2 depicts the correlation between titanium metal particle concentration and twenty-ounce bottle preform L* value.
Figure 3:
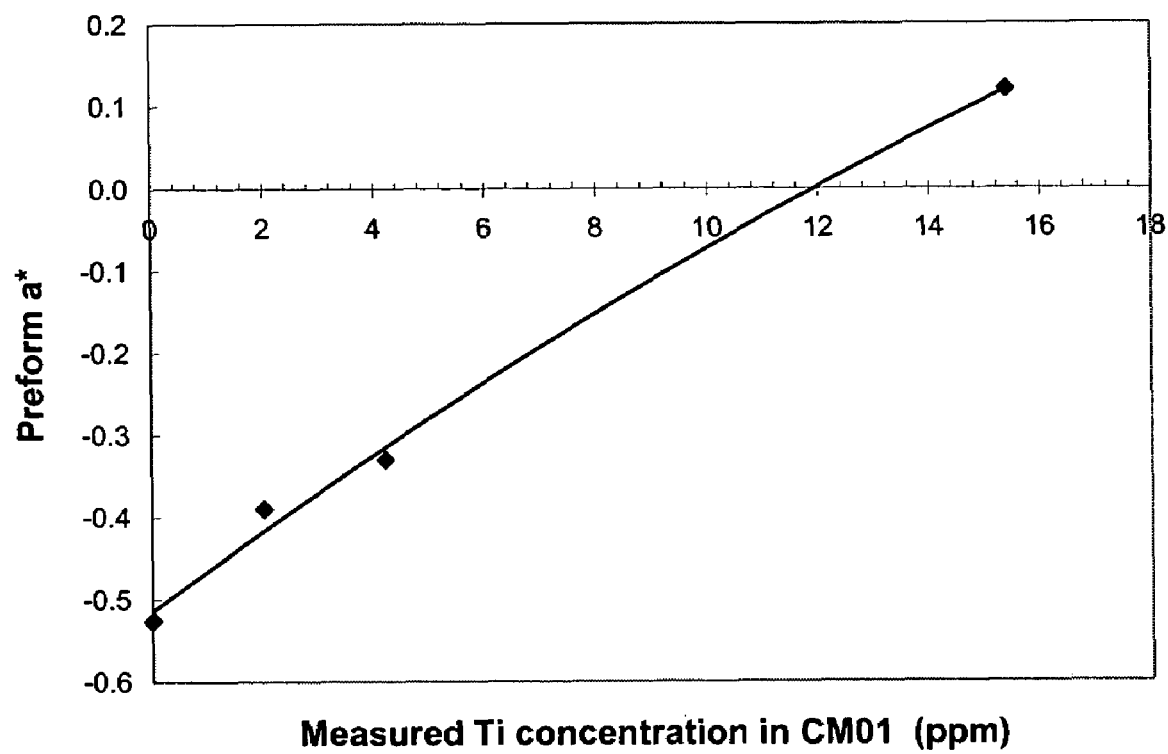
FIG. 3 depicts the correlation between titanium metal particle concentration and twenty-ounce bottle preform a* value.

Correlations between titanium metal particles concentration and preform color properties are shown in FIGS. 2-4, from which one can see that titanium metal particles led to satisfactory preform L*, a*, and b* values.

FIG. 2 depicts the correlation between titanium metal particle concentration and twenty-ounce bottle preform L* value.

FIG. 3 depicts the correlation between titanium metal particle concentration and twenty-ounce bottle preform a* value.

FIG. 5 depicts the crystallization half time ($t_{1/2}$) results for systems with different levels of titanium metal particles.

I claim:
1. A polyester composition having improved reheat, comprising:
 a polyester polymer; and
 metallic titanium particles, having a median particle size less than 1 μm, dispersed in the polyester polymer in an amount from 0.5 ppm to 50 ppm, with respect to the total weight of the polyester composition.

2. The polyester composition of claim 1, wherein the metallic titanium particles have a median particle size from about 0.005 μm to less than 1 μm.

3. The polyester composition of claim 1, wherein the metallic titanium particles have a median particle size from 0.005 µm to 0.05 µm.

4. The polyester composition of claim 1, wherein the metallic titanium particles are present in an amount of from 5 ppm to 50 ppm, with respect to the total weight of the polyester composition.

5. The polyester composition of claim 1, wherein the polyester polymer comprises polyethylene terephthalate.

6. The polyester composition of claim 1, wherein the polyester composition is in the form of a molded article.

7. The polyester composition of claim 1, wherein the polyester polymer comprises a continuous phase, and wherein the metallic titanium particles are dispersed within the continuous phase.

8. The polyester composition of claim 1, wherein the metallic titanium particles provide the polyester composition with a reheat improvement temperature (RIT) of at least 50° C. while maintaining preform L* value of 60 or more.

9. The polyester composition of claim 1, wherein the metallic titanium particles comprise titanium-coated particles.

10. A polyester composition having improved reheat, comprising:
    a polyester polymer; and
    metallic titanium particles, having a median particle size from about 0.005 µm to about 100 µm, dispersed in the polyester polymer, wherein the metallic titanium particles comprise hollow spheres comprised of titanium.

11. The polyester composition of claim 1, wherein the metallic titanium particles comprise a titanium alloy, wherein titanium is present in an amount of at least 30 wt. %, with respect to the total weight of the titanium alloy.

12. The polyester composition of claim 1, wherein the metallic titanium particles comprise a titanium alloy, wherein titanium is present in an amount of at least 50 wt. %, with respect to the total weight of the titanium alloy.

13. The polyester composition of claim 12, wherein the titanium alloy further comprises one or more of: aluminum, tin, or zirconium.

14. The polyester composition of claim 1, wherein the metallic titanium particles comprise a titanium alloy that includes aluminum present in an amount from about 0.5 wt. % to about 7.5 wt. %.

15. The polyester composition of claim 1, wherein the metallic titanium particles have a particle size distribution in which the span (S) is from 0 to about 10.

16. The polyester composition of claim 1, wherein the metallic titanium particles have a particle size distribution in which the span (S) is from 0.01 to 2.

17. A polyester composition having improved reheat, comprising:
    a polyester polymer in which poly(ethylene terephthalate) residues comprise at least 90 wt. % of the polyester polymer; and
    metallic titanium particles, having a median particle size from about 0.005 µm to less than 1 µm, randomly dispersed in the polyester polymer in an amount from about 1 to about 50 ppm, wherein the polyester composition has a reheat improvement temperature of 10° C. or more and an L* brightness level of 60 or more.

18. The polyester composition of claim 1, wherein the metallic titanium particles have a median particle size of 0.05 µm.

19. A polyester composition having improved reheat, comprising:
    a polyester polymer; and
    metallic titanium particles dispersed in the polyester polymer in an amount from 2 ppm to 15.4 ppm, with respect to the total weight of the polyester composition.

20. A polyester composition having improved reheat, comprising:
    a polyester polymer; and
    metallic titanium particles dispersed in the polyester polymer in an amount from 4.2 ppm to 15.4 ppm, with respect to the total weight of the polyester composition.

* * * * *

UNITED STATES PATENT AND TRADEMARK OFFICE
CERTIFICATE OF CORRECTION

PATENT NO. : 7,300,967 B2
APPLICATION NO. : 10/988226
DATED : November 27, 2007
INVENTOR(S) : Xia It is certified that error appears in the above-identified patent and that said Letters Patent is hereby corrected as shown below:

Column 25, Line 19, Claim 8 "50°C" should read -- 5°C --

Signed and Sealed this

Second Day of December, 2008

JON W. DUDAS
*Director of the United States Patent and Trademark Office*